United States Patent [19]
Swenson, Jr.

[11] Patent Number: 5,223,706
[45] Date of Patent: Jun. 29, 1993

[54] FIBER OPTIC COLLIMATOR FOR POSITION ENCODERS

[75] Inventor: Richard I. Swenson, Jr., Highland Lakes, N.J.

[73] Assignee: Allen-Bradley Company, Inc., Milwaukee, Wis.

[21] Appl. No.: 683,229

[22] Filed: Apr. 10, 1991

[51] Int. Cl.⁵ .............................................. H01J 5/16
[52] U.S. Cl. ......................... 250/227.21; 250/231.18
[58] Field of Search ......... 250/211 K, 227.11, 231.18, 250/237 G, 227.21; 341/14; 359/234–236

[56] References Cited

U.S. PATENT DOCUMENTS

| | | | |
|---|---|---|---|
| 3,481,195 | 12/1969 | Hendrickson et al. | 73/156 |
| 3,622,793 | 11/1971 | Dalton et al. | 250/219 D |
| 3,729,047 | 4/1973 | Bohnlein et al. | 164/150 |
| 4,103,155 | 7/1978 | Clark | 250/211 K |
| 4,334,152 | 6/1982 | Dakin et al. | 250/231.18 |
| 4,731,530 | 3/1988 | Mikan | 250/211 K |
| 5,006,719 | 4/1991 | Blaser | 250/227.11 |
| 5,015,056 | 5/1991 | Yamaguchi et al. | 250/227.11 |

Primary Examiner—David C. Nelms
Assistant Examiner—S. Allen
Attorney, Agent, or Firm—Quarles & Brady

[57] ABSTRACT

A collimator/aperture, in an absolute encoder, produces a line of light to illuminate the encoder's code wheel. The collimator employs a bundle of fiber optics to receive an intense and generally cylindrical beam of laser light. The opposing end of the fibers are spread in a fan and clamped between carefully dimensioned clamping surfaces to produce a line of light one fiber thick. The collimator/aperture avoids the wasted energy associated with a slit mask. The fiber optics are held parallel near their light emitting ends and the ends are polished square to the axis of the fibers to provide a high degree of collimation. Fibers with low numerical aperture further improve the collimation.

14 Claims, 2 Drawing Sheets

FIBER OPTIC COLLIMATOR FOR POSITION ENCODERS

BACKGROUND OF THE INVENTION

1. Field of the Invention

The present invention concerns position encoders and in particular absolute encoders employing a "linear" light source.

2. Background Art

Position encoders ("encoders") are electro-mechanical devices producing a digital output related to the position of a movable element of the encoder. In one such encoder design: a rotary encoder, the movable element is a rotatable shaft attached to a disk shaped rotor. The rotor has an optically readable pattern marked on its surface, formed by alternating opaque and transmissive frames.

The frames are illuminated from one side by an illumination source, light traveling from the illumination source through the opaque and transmissive frames of the rotor and then through similar frames in a stationary stator, to be detected by a stationary photodetector. Rotation of the shaft moves the rotor which in turn causes a fluctuation in the light transmitted through the rotor and stator thus producing a signal that may be decoded into a digital indication of shaft movement.

Encoders may be either absolute encoders or incremental encoders. Incremental encoders provide only an indication of the change in position of the encoder shaft. The rotor of an incremental encoder ordinarily contains a uniform periodic pattern whose movement past a photodetector creates an index signal indicative of the amount that the shaft has rotated. Two or more photodetectors arranged with an offset of 90° ("quadrature") may be used to provide an indication of the direction of rotation as well as amount of rotation of the shaft, as is understood in the art.

Absolute encoders, on the other hand, produce a unique digital code word for each encoder position. The rotor of an absolute encoder may carry a series of concentric tracks whose opaque and transmissive segments, examined along a line of radius, reveal a binary or Grey code value indicative of shaft position. Each track provides the value of one bit and is read by a separate photodetector to produce an output digital word.

One difference between the construction of an absolute and incremental encoder is that, in an incremental encoder, the light source may illuminate a relatively wide area of the rotor (because the pattern on the stator and rotor is spatially periodic on a small scale). Light is gathered over a series of adjacent frames separated by one of the periodicity to increase the total light signal. The stator mask and the photodetector effectively "average" the light transmitted by many frames within this illuminated area.

In contrast, in an absolute encoder, the mask and rotor patterns are not periodic. Any light passing through the rotor or stator outside of the aligned frames degrades the signal produced by the aligned frames reducing the contrast in signal strength produced by transmissive and opaque frames.

For this reason the light source in an absolute encoder must be masked to a narrow beam one frame wide. The light must also be highly collimated so that the detector receives the masked light primarily along an axis defined by the aligned frames of the stator and rotor. Collimation generally defines the degree to which the wavefronts of the propagating light are planar, whereas the masking aperture defines the width of the beam of propagating light.

One problem with the very narrow beams used in absolute encoders is that little light energy is transmitted to each photodetector. Typically, therefore, the attenuation introduced by the slit mask forming the narrow beam is compensated for by first focusing the light source on the mask. If the light source is linear, i.e., an incandescent bulb with a linear filament or a linear array of light emitting diodes, this focused image will also be similarly linear, reducing somewhat the energy lost in the masking process. Even so, such masking systems are low in efficiency and generate unnecessary heat and consume unnecessary power.

As the resolution of the absolute encoder increases, the degree to which the beam is collimated also becomes increasingly important. Poor collimation may undo the intended effect of the mask and cause light leakage between frames of the mask pattern degrading the encoder signal. Precise collimation in the above described focussing and masking systems depends on accurate alignment of the focusing elements which generate the masked beam. Such precise alignment makes the manufacture of such encoders more expensive and renders the encoders susceptible to physical shock which may misalign the optical elements.

SUMMARY OF THE INVENTION

The present invention uses fiber optics to collimate and form an intense cylindrical light beam into a highly collimated linear light beam one fiber wide and suitable for use with high resolution absolute position encoders.

Specifically, a light source produces a beam of light collimated along a first axis to be received by a bundle of optical fibers having a cross-section similar to that of the light beam. The free ends of the fibers are received by a clamp having opposed clamping surfaces for collecting the optical fiber into a second bundle having a cross-section as thick as the diameter of the optical fibers.

It is one object of the invention to provide for the efficient transmission of light through an extremely narrow aperture. The optical fibers allow the formation of a narrow beam of light without the wasted light energy associated with more conventional slit masks. The diameter of the optical fibers serves to control precisely the width of the resultant beam and to ensure uniform illumination over its length.

Each fiber may be held parallel to the others to ensure collimation over a linear beam of substantial length. The optical fibers may have low numeric aperture to further improve the collimation of the resultant beam.

It is thus another object of the invention to provide a narrow continuous beam of light that is highly collimated. The optical characteristics of the optical fibers limits their acceptance of light but beneficially also limits their transmission of light to a narrow angle. This intrinsic collimation that the fibers provide does not rely on the precise location of several spaced optical elements and thus is resistant to physical shock.

The light source may be a solid state laser eliminating the need for a less precise and less robust incandescent sources.

It is thus another object of the invention to provide a rugged collimation system that provides a narrow, precisely placed linear light beam without the susceptibility to misalignment that may be experienced by complex lens systems.

It is another object of the invention to produce a collimator and masking aperture that is readily constructed with obtainable manufacturing tolerances. The optical fibers are held at one end in a compact bundle and the free ends are spread in a fan in a trough shaped clamp having a planar clamping surface. The width of the trough is equal to the width of the fibers times the number of fibers. The free ends of the fibers are then compressed between the clamp surface and a second opposing and matching clamp surface until the clamp surfaces are separated by the width of the fibers.

The use of optical fibers aligned by clamping allows the creation of a precise line of light one fiber thick using standard injection molded components.

Other objects and advantages will be apparent to those experienced in the art from the description of a preferred embodiment of the invention which follows. In the description, reference is made to the accompanying drawings, which form a part hereof, and which illustrate one example of the invention. Such example, however, is not exhaustive of the various alternative forms of the invention, and therefore reference is made to the claims which follow the description for determining the scope of the invention.

DETAILED DESCRIPTION OF THE PREFERRED EMBODIMENT

Figure 1:
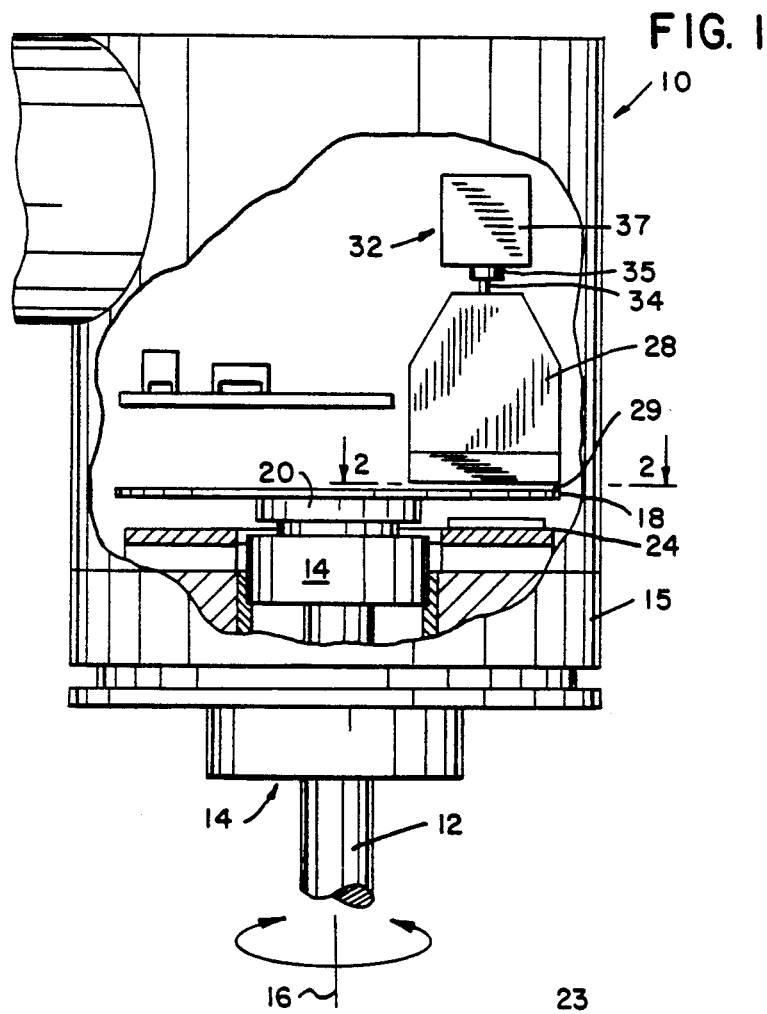
FIG. 1 is an elevation in cutaway of a rotary position encoder suitable for use with the present invention, showing the relative position of a laser, a collimator/aperture, a code wheel, and a photodetector array.

Referring to FIG. 1, a rotary shaft encoder 10 suitable for use with the present invention includes an input shaft 12 held by bearings 14 retained in a housing 15 so that the shaft 12 is free to rotate about its axis 16 and yet resists translation along its axis 16 into or out of housing 15.

A disk shaped code wheel 18 is held inside the housing 15 at one end of the shaft 12 by flange 20 so as to rotate with rotation of the shaft 12 about axis 16. The code wheel 18 is oriented so that it is centered about, and its plane is perpendicular to, the axis 16.

Figure 2:
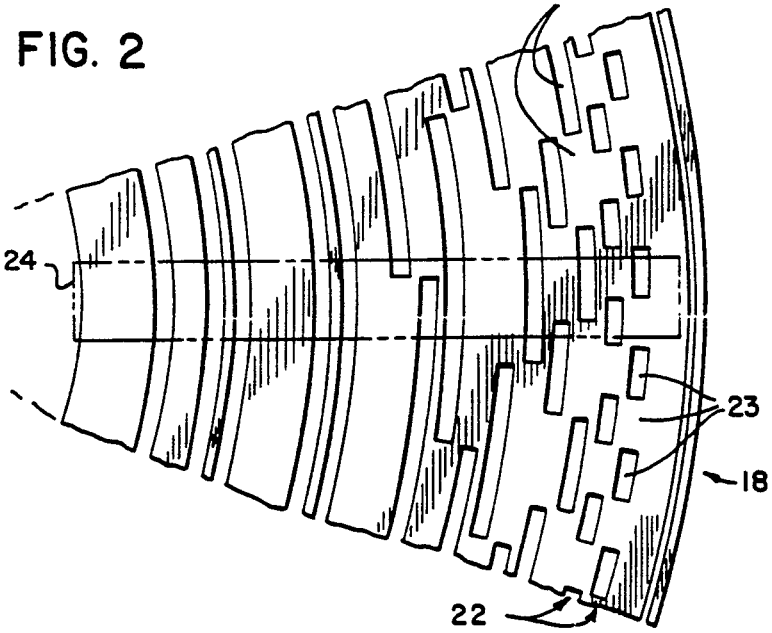
FIG. 2 is a detail of a plan view of the pattern of the code wheel of FIG. 1 as positioned over the photodetector array.

Referring to FIGS. 1 and 2, the face of the code wheel 18 holds a series of annular, concentric tracks 22 each comprising alternating opaque and transmissive segments 23. In one embodiment, the code wheel 18 may be a borosilicate glass plate metalized with chrome, by photographic processes such as are known in the art, to produce the opaque segments 23 and left clear to produce the transmissive segments 23.

Figure 3:
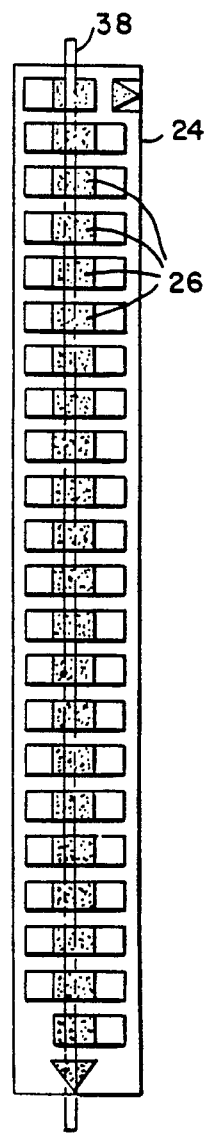
FIG. 3 is a plan view of the photodetector array of FIG. 2 with the code wheel removed.

Referring to FIGS. 2 and 3, a photodetector array 24 holds a series of photosensitive cells 26 spaced uniformly along the length of the photodetector array 24. The photodetector array 24 extends radially beneath the code wheel 18 so as to be covered by the surface of the code wheel 18 as the code wheel 18 rotates about axis 16. The tracks 22 of the code wheel 18 are spaced along the radius of the code wheel 18 so that each track 22 aligns with one photosensitive cell 26 when the photodetector array 24 is in position beneath the code wheel 18. It will be understood from this description, that as the code wheel 18 rotates, the individual photocells 26 of the photodetector array 24 are alternately aligned with opaque or transparent segments 23 of their respective tracks 22 and thus may receive or be prevented from receiving light directed downward from the top of the code wheel 18.

Figure 4:
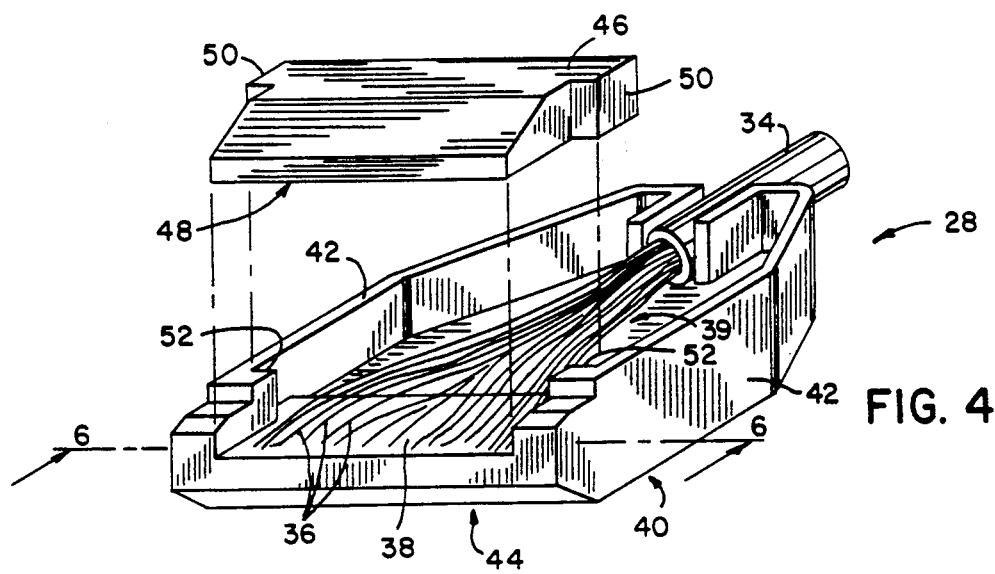
FIG. 4 is a perspective view of the collimator/aperture of FIG. 1.

Referring to FIGS. 1 and 4, a fiber optic collimator/aperture 28 is positioned above the code wheel 18 across from the photodetector array 24, so as to direct a line of light 29 downward through transparent segments 23 of the tracks 22 of the code wheel 18 toward the photodetector array 24. The collimator/aperture 28 receives a generally cylindrical beam of light 30 from solid state laser assembly 32 into a ferrule 34 positioned at the upper end of the collimator/aperture 28. The collimator/aperture 28 converts this cylindrical beam of light 30 into a line of light 29 which projects from the lower end of the collimator/aperture 28 to illuminate the photodetector array 24 through the transparent segments 23 of the code wheel 18.

Referring again to FIG. 3, an illuminated area 38 on the surface of the photodetector array 24, produced by the line of light 29, is extremely narrow and much less than the extent of either the photosensitive cells 26 or the segments 23 as measured along the circumference of the code wheel 18. This ensures that the angular resolution of the encoder 10, that is, the ability of the encoder 10 to distinguish small angular changes in the position of shaft 12, is not degraded by light transmitted through transparent segments 23 on either side of the segments aligned with the photodetector array ("the aligned segments").

Figure 5:
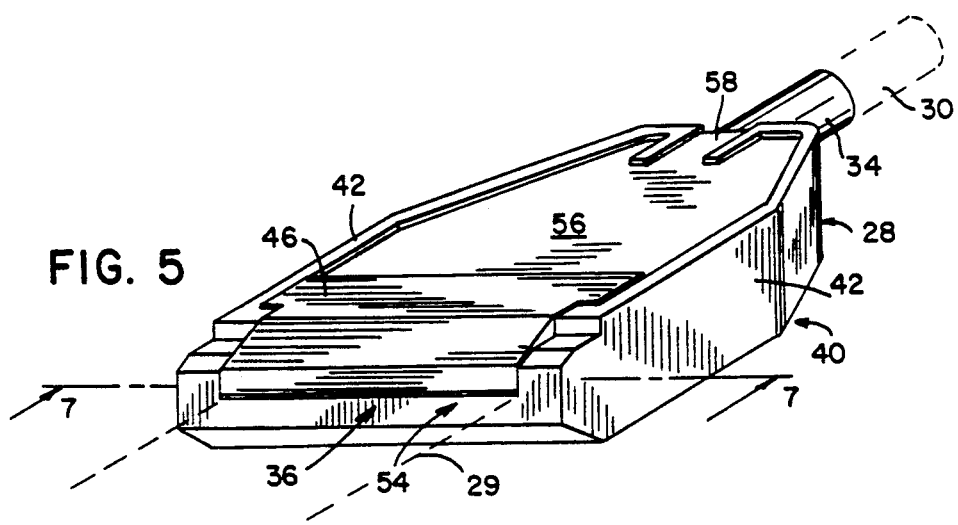
FIG. 5 is an exploded perspective view of the parts of the collimator/aperture of FIG. 3 prior to assembly.

Referring to FIGS. 1 and 5, the collimator/aperture 28 is constructed from a number of optical fibers 36 having one end held within the tubular ferrule 34 for receiving the generally cylindrical beam 30 from the laser assembly 32. The fiber optics 36 are preferably quartz fiber having a numerical aperture of 0.29. The laser assembly 32 includes an aspherical lens 35 which receives divergent but coherent laser light from a solid state laser 37 and collimates it into the generally cylindrical beam 30.

The lengths of the optical fibers 36 not held by the ferrule 34 are spread in a fan 39 along a clamping surface 38 of a tray-like housing 40. The ferrule 34 is attached to one end of the housing 40 through a gap in two opposing vertical walls 42 extending perpendicularly up from the edges of the clamping surface 38. The vertical walls proceed from either side of the ferrule 34 around the edges of the clamping surface 38 to restrain the optical fibers 36 between the vertical walls 42 on or above the clamping surface 38.

The vertical walls 42 do not extend to the edge 44 of the clamping surface 38 opposite to the ferrule 34 but rather the optical fibers 36 are free to extend in the fan 39 along clamping surfaces 38 and over the edge 44. Near the edge 44, the vertical walls 42 are parallel to each other and separated by a distance substantially equal to the diameter of the optical fibers 36 times the number of optical fibers.

Figure 6:
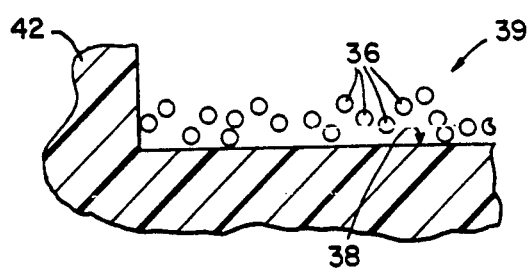
FIG. 6 is a detail of a cross section of the collimator/aperture of FIG. 5 taken along line 6—6.
Figure 7:
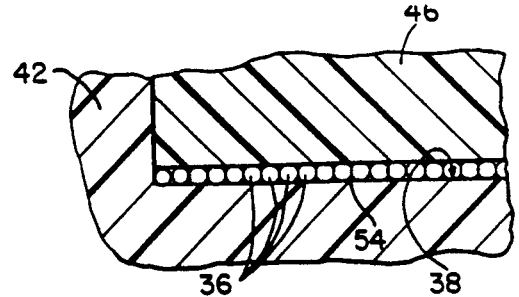
FIG. 7 is a detail of a cross section of the collimator/aperture of FIG. 4 taken along line 7—7.

Referring to FIG. 6, the optical fibers 36 of the fan 39 are initially distributed irregularly over the clamping surface 38 albeit generally in a line between the vertical walls 42. Referring to FIG. 5, a clamping bar 46 having a generally planar clamping surface 48 for fitting against the clamping surface 38 of housing 40 and between walls 42, is used to compress the optical fibers 36 into a single plane as shown in FIG. 7. Tabs 50, on either end of the clamping bar 46 are received by guide ledges 52 in the portion of the vertical walls 42 near edge 44 to align the clamping bar 46 along edge 44.

The space between walls 42 near edge 44 is such that the optical fibers 36, when compressed between the clamping surfaces 38 and 48 are compelled to form a substantially continuous line one fiber thick. Further, the parallel orientation of the walls 42 near edge 44 is such that the optical fibers 36 are parallel with each other near edge 44 and thus transmit their light along a single axis to form line of light 29.

The clamping bar 46, once the optical fibers 36 are properly compressed, is bonded in place with a cyanoacrylate adhesive 54 which wicks in between the clamping bar 46 and the housing 40 around the optical fibers 36 so as to immobilize the optical fibers 36 between clamping surfaces 38 and 48 and to fill small gaps therebetween in preparation of the introduction of a potting compound 56.

The potting compound 56, comprised of a generally available two-part epoxy resin mixture, is introduced into the cavity formed by the clamping bar 46 and the vertical walls 42 and the clamping surface 38. The gap in the vertical walls 40, through which the ferrule 34 passes, is plugged with an elastomeric substance 58 to prevent the potting compound 56 from flowing out of the cavity prior to the potting compound's setting.

It should be noted at this point that the optical fibers 36, as they protrude from between the clamping surfaces 38 and 48 near edge 44 although aligned, are of uneven length as a result of their different paths from the ferrule 34 to the edge 44 and therefore project outward from edge 44 at different distances.

When the potting compound 56 has set, therefore, the optical fibers 36 are cut to be even with the edge 44 and polished by means of a series of abrasive polishing wheels of successively finer grit as is understood in the art. Importantly, as a result of the aligning nature of the parallel walls 42, the exposed end of each optical fiber 36 is polished perpendicularly to the fiber's axis.

Similarly, any unevenness in the fiber optics 36 as exposed by the ferrule 34 is corrected by cutting and polishing those fibers extending out of the ferrule 34 away from the housing 40. The polishing of the ends of the fiber optics 36 exposed by the ferrule 36 ensures that the maximum light energy will be received from the solid state laser assembly 32 into the optical fibers 36 held within the ferrule 34 and that the line of light 29 emitted by fiber optics 36 at the edge 44 of the collimator/aperture 28 remains highly collimated.

It will be recognized from this description that the use of the optical fibers 36 to create the line of light 29 is much more efficient than the use of a slit mask which necessarily wastes considerable light energy. It will also be apparent from this description that the collimated line of light 29 produced by the parallel orientation of the fiber optics 36 near edge 44 and the polishing of those ends of the fiber optics 36 perpendicularly to the axis of the fiber optics 36 will be superior in uniformity and shock resistance to the collimation obtained by conventional collimating optics.

It will occur to those who practice the art that many modifications may be made without departing from the spirit and scope of the invention. In order to apprise the public of the various embodiments that may fall within the scope of the invention, the following claims are made.

I claim:

1. In a position encoder including a mask attached to an actuator shaft for selectively blocking a first beam of light depending on the position of the actuator shaft and including a plurality of photoreceptors for producing a signal dependant on the blocking of the first beam of light and hence the position of shaft, an optical assembly comprising:

a light source for producing a second beam of light having a first cross section and collimated along a first axis;

a plurality of optical fibers each having a diameter and arranged for receiving the second beam from the light source, over the first cross section of light, at a first end and transmitting the light to a second end; and a clamp having matching opposed clamping surfaces for collecting the optical fibers at their second ends into a fan having a third cross-section as thick the diameter of the optical fibers to produce the first beam of light also with the third cross section to be received by the plurality of photoreceptors.

2. The optical assembly of claim 1 wherein the light source comprises:

a laser for producing coherent light; and a lens assembly for collimating the coherent light along the first axis into the second beam.

3. The optical assembly of claim 1 wherein the optical fibers are selected for low numerical aperture.

4. The optical assembly of claim 1 wherein the clamp holds the optical fibers parallel to a single second axis at their second ends.

5. The optical assembly of claim 4 wherein the second axis is parallel with the first axis.

6. The optical assembly of claim 1 wherein the clamp collects the fibers at their second ends into a second bundle having a third cross section as thick as the diameter of the optical fibers and as long as the product of the diameter of the optical fibers and the number of optical fibers to form a continuous first beam of light.

7. The optical assembly of claim 1 wherein the first cross section is substantially circular.

8. The optical assembly of claim 1 wherein the clamping surfaces are planar.

9. The method of claim 1 wherein the clamp includes walls parallel to the first axis and extending from the clamping surfaces near the second end for aligning the optical fibers in parallel orientation between the first and second clamp surfaces.

10. A method of producing an optical assembly for a position encoder including a mask attached to an actuator shaft for selectively blocking light from the optical assembly depending on the position of the actuator shaft and including a plurality of photoreceptors for producing a signal dependant on the blocking of the light from the optical assembly, the method comprising the steps of:

clamping one end of a plurality of optical fibers within a ferrule in a compact bundle for the receipt of light;

laying the remaining free ends of the optical fibers in a trough shaped clamp open adjacent to the free ends to allow transmission of light therefrom having a first planar clamping surface extending generally perpendicular to the length of the optical fibers, a distance equal to the width of the fibers times the number of fibers; and compressing the free ends of the fibers between the first clamp surface and a second opposing and matching clamp surface parallel to the first clamp surface until the first and second clamp surfaces are separated by the width of the fibers.

11. The method of claim 10 wherein one clamp surface includes perpendicular side walls for aligning the optical fibers in parallel orientation when the first and second clamp surfaces are compressed.

12. The method of claim 10 including the step of attaching the ferrule to the clamp surfaces.

13. The method of claim 10 wherein the optical fibers are positioned to extend from between the first and second clamp surfaces along an edge and including the steps of:

introducing an adhesive into the space between the first and second clamp surfaces after the optical fibers are compressed; and polishing the ends of the optical fibers protruding from the first and second clamp surfaces to be perpendicular to the edge.

14. The method of claim 10 wherein the ends of the optical fibers are polished to be perpendicular to their axes and to the first axis.

* * * * *